United States Patent
Sheu et al.

(10) Patent No.: US 9,042,651 B2
(45) Date of Patent: May 26, 2015

(54) MULTI-POINT IMAGE LABELING METHOD

(71) Applicant: NATIONAL YUNLIN UNIVERSITY OF SCIENCE AND TECHNOLOGY, Douliu, Yunlin County (TW)

(72) Inventors: Ming-Hwa Sheu, Douliu (TW); Shyue-Wen Yang, Douliu (TW); Chuang-Chun Hu, Douliu (TW)

(73) Assignee: NATIONAL YUNLIN UNIVERSITY OF SCIENCE AND TECHNOLOGY, Yunlin County (TW)

( * ) Notice: Subject to any disclaimer, the term of this patent is extended or adjusted under 35 U.S.C. 154(b) by 273 days.

(21) Appl. No.: 13/660,465

(22) Filed: Oct. 25, 2012

(65) Prior Publication Data

US 2013/0051675 A1    Feb. 28, 2013

Related U.S. Application Data

(63) Continuation-in-part of application No. 12/615,119, filed on Nov. 9, 2009, now abandoned.

(51) Int. Cl.
*G06K 9/34* (2006.01)
*G06T 7/00* (2006.01)

(52) U.S. Cl.
CPC ..... *G06T 7/0081* (2013.01); *G06T 2207/30232* (2013.01)

(58) Field of Classification Search
None
See application file for complete search history.

(56) References Cited

U.S. PATENT DOCUMENTS

| 4,334,274 A | 6/1982 | Agui et al. |
| 4,624,013 A | 11/1986 | Urushibata |
| 5,018,214 A | 5/1991 | Pasch |
| 5,305,393 A | 4/1994 | Kawai et al. |

(Continued)

FOREIGN PATENT DOCUMENTS

| JP | 60003073 | 1/1985 |
| JP | 03171378 | 7/1991 |

(Continued)

OTHER PUBLICATIONS

N. Ranganathan, et al., "A High Speed Systolic Architecture for Labeling Connected Components in an Image", IEEE Transactions on Systems, Man and Cybernetics, vol. 25, No. 3, Mar. 1995, pp. 415-423.

*Primary Examiner* — Wenpeng Chen
(74) *Attorney, Agent, or Firm* — Muncy, Geissler, Olds & Lowe, P.C.

(57) ABSTRACT

A multi-point image labeling method adopts an image labeling device to label an object pixel matrix containing image data and makes adjacent array elements with image data have an identical image label value. Next, the image labeling device provides a multi-point label window, which designates a non-zero temporary labeled value to store in the register according to the temporary labeled value of the adjacent array elements. Next, the image labeling device provides a label-equivalence window, which generates label-equivalence information according to the adjacent temporary labeled values. Next, an equivalent-substitution processing process is performed on the temporary labeled values according to the label-equivalence information to generate label-equivalence substitution information. Then, the temporary labeled values are replaced according to the label-equivalence substitution information to obtain the resultant image labeled values and complete the image labeling of the object pixel matrix.

4 Claims, 17 Drawing Sheets

(56) References Cited

U.S. PATENT DOCUMENTS

| | | |
|---|---|---|
| 5,602,940 A | 2/1997 | Inoue et al. |
| 5,717,784 A | 2/1998 | Yanagishita et al. |
| 5,909,507 A | 6/1999 | Yanagishita et al. |
| 5,937,091 A | 8/1999 | Yanagishita et al. |
| 6,038,335 A | 3/2000 | Yokoyama et al. |
| 6,081,618 A | 6/2000 | Naoi et al. |
| 6,256,108 B1 | 7/2001 | Dziesietnik et al. |
| 7,869,631 B2 | 1/2011 | Xu et al. |
| 7,974,471 B2 | 7/2011 | Matsuno |
| 2007/0248266 A1 | 10/2007 | Matsuno |
| 2009/0196505 A1 | 8/2009 | Sullender |
| 2010/0021061 A1 | 1/2010 | Campbell |
| 2011/0110591 A1* | 5/2011 | Sheu et al. .............. 382/180 |

FOREIGN PATENT DOCUMENTS

| | | |
|---|---|---|
| JP | 2002230540 | 8/2002 |
| WO | WO 2006019165 | 2/2006 |

* cited by examiner $A_1$ | 0 | 1 | 2 | 1 | 4 | 5 | 6 | 7 |

MULTI-POINT IMAGE LABELING METHOD

This application is a continuation-in-part, and claims priority, of from U.S. patent application Ser. No. 12/615,119 filed on Nov. 9, 2009, entitled "MULTI-POINT IMAGE LABELING METHOD", the entire contents of which are hereby incorporated by reference.

FIELD OF THE INVENTION

The present invention relates to an image processing method, particularly to an image labeling method.

BACKGROUND OF THE INVENTION

The image labeling technology can separate different object regions and give each object region a unique labeled value. In static or dynamic image object detection, the object regions (or image data) must be identified and formed an object pixel matrix. Next, the image labeling technology is used to discriminate different object regions with different labels, and then can be analyzed and compared. The image labeling technology can apply to security monitor systems, theft-proof monitor systems, dynamic image surveillance systems, traffic flow statistic systems, etc.

The conventional image labeling technologies are usually implemented by a label window, which sequentially scans the array elements of an object pixel matrix to find out the image data. The image labeling technology then labels the image data in a window operation. In order to make adjacent array elements with image data have an identical labeled value, the conventional image labeling technology has to perform scanning many times and undertake complicated calculations to update the adjacent data-containing array elements into an identical labeled value. For high-resolution images, the processing of the conventional image labeling technologies is too slow to meet update requirements.

SUMMARY OF THE INVENTION

The primary objective of the present invention is to provide an image labeling method to accelerate an image processing speed.

To achieve the abovementioned objective, the present invention proposes a multi-point image labeling method, which uses an image labeling device to label an object pixel matrix to make the object pixel matrix contain image data and make adjacent array elements have identical image label values. The image labeling device comprises a controller, an input image memory, a multi-pixel image labeling unit, and an output labeled memory. The method of the present invention comprises steps: storing the object pixel matrix into the input image memory; providing a multi-point label window via the controller; providing an label-equivalence window to perform an labeling process and an label-equivalence information processing process via the multi-pixel image labeling unit; performing an equivalent-substitution processing process to temporary labeled values to generate a label-equivalence substitution information according to the label-equivalence information; performing an image labeled value substitution process according to the label-equivalence substitution information to replace the temporary labeled value to obtain an image labeled value; storing the image labeled values in the output labeled memory via the controller.

The multi-point label window has at least three inclined-arranged label points. The label-equivalence window is used to generate label-equivalence information. The controller uses the multi-point label window to simultaneously scan data of the object pixel matrix and provide the data of the object pixel matrix to the multi-pixel image labeling unit. The multi-pixel image labeling unit labels the array elements having image data temporary labeled values and assigns non-zero temporary labeled values and stores the non-zero temporary labeled values in a register according to the temporary labeled values of adjacent labeled array elements. When at least one non-zero temporary labeled value is in the adjacent array element, the non-zero temporary labeled value is selected at the first priority according to a clockwise priority rule with the left side as the start point. On the other hand, the label-equivalence window associates two different temporary labeled values that are connected by the image data in the adjacent array element to generate label-equivalence information.

According to the label-equivalence information, an equivalent-substitution processing process is performed to the temporary labeled values to generate label-equivalence substitution information of the associated temporary labeled values. The temporary labeled values are then replaced to obtain image labeled values according to the label-equivalence substitution information.

As the multi-point label window of the present invention has at least three inclined-arranged label points, it can generate multiple temporary labeled values by multi-point labeling in each window operation. The label-equivalence information is used to integrate associated temporary labeled values, and the final image labeled values are finished by the image labeled value substitution process. Therefore, the present invention can accelerate the labeling process.

BRIEF DESCRIPTION OF THE DRAWINGS

FIGS. 9A-9F are diagrams schematically showing the processes of an inter-row substitution processing process according to the present invention.

DETAILED DESCRIPTION OF THE PREFERRED EMBODIMENTS

Below, the embodiments are described in detail to demonstrate the technical contents of the present invention. However, it should be noted that the embodiments are only to exemplify the present invention but not to limit the scope of the present invention.

Figure 1:
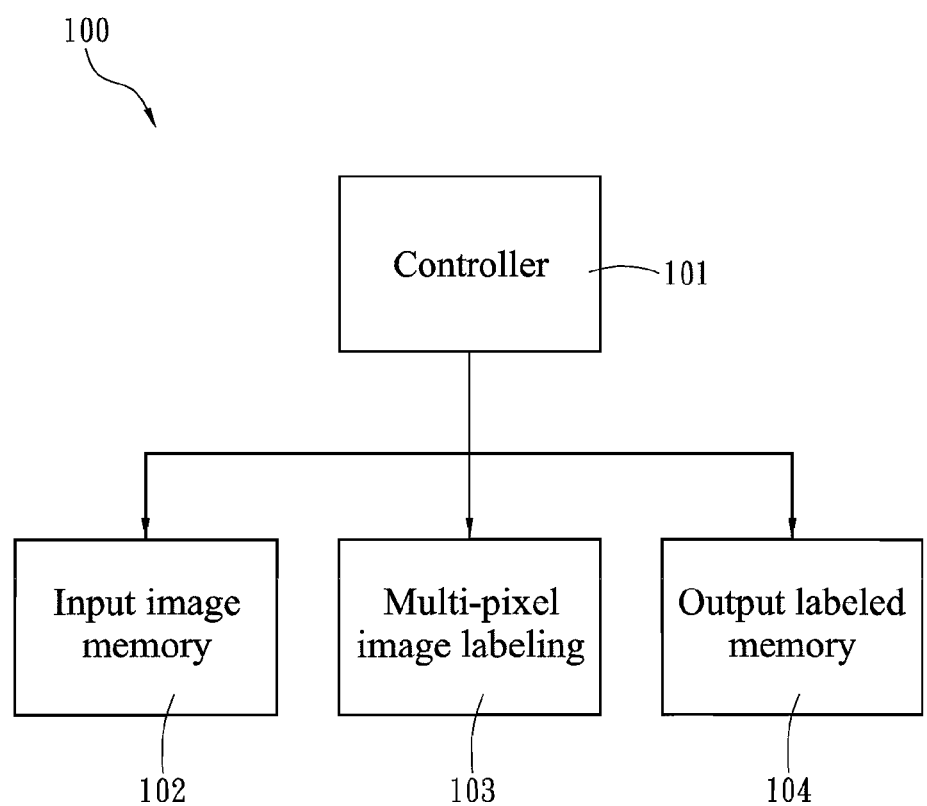
FIG. 1 is a diagram schematically showing the components of an image labeling device according to the present invention.
Figure 2:
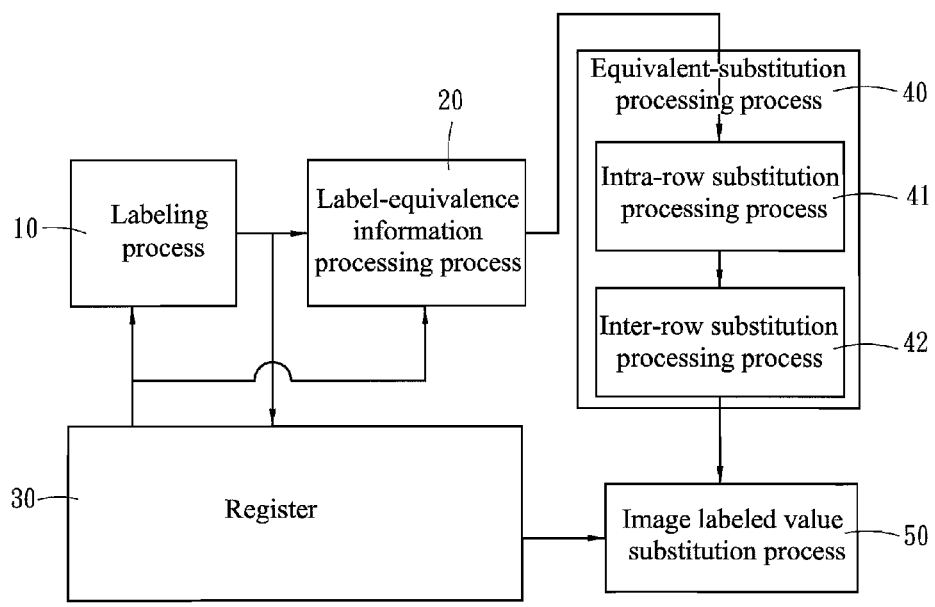
FIG. 2 is a diagram schematically showing the architecture according to the present invention.
Figure 3:
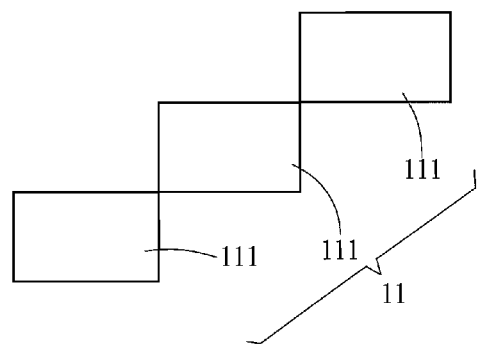
FIG. 3 is a diagram schematically showing a multi-point label window according to the present invention.
Figure 4A:
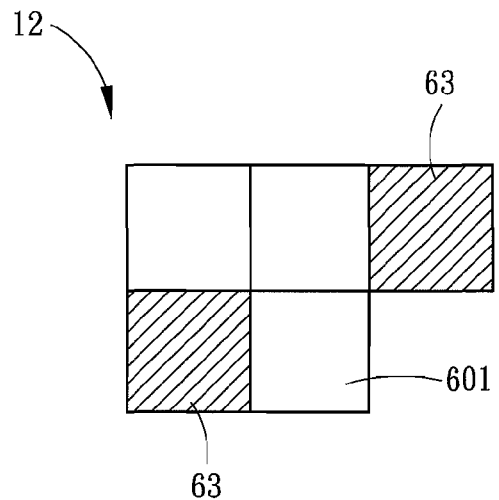
FIG. 4A is a diagram schematically showing a label-equivalence window according to the present invention.
Figure 4B:
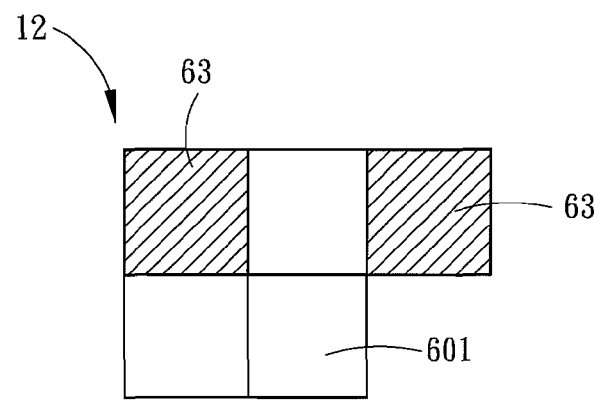
FIG. 4B is another diagram schematically showing the label-equivalence window according to the present invention.
Figure 5A:
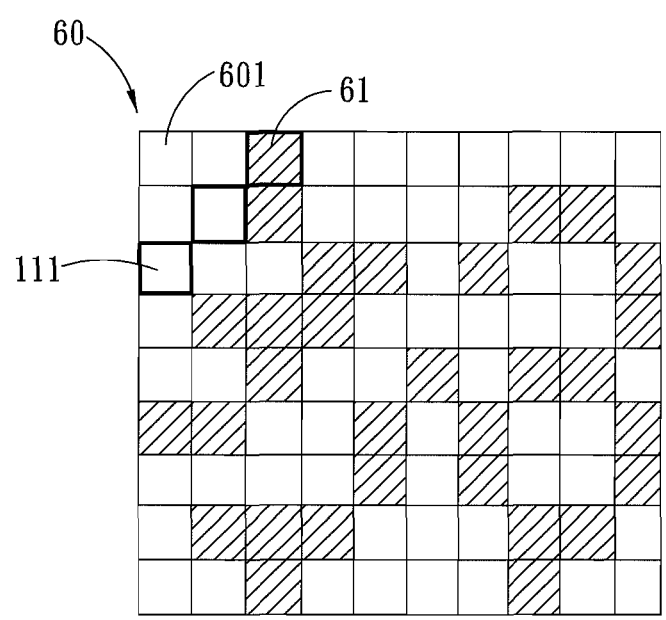
FIG. 5A is a diagram schematically showing an unlabeled object pixel matrix.
Figure 6:
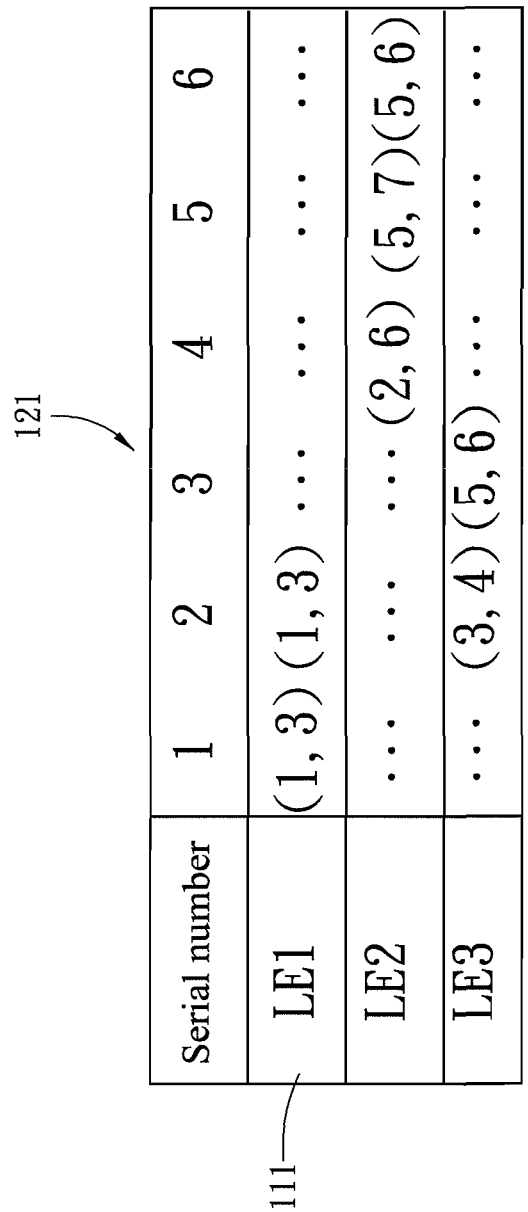
FIG. 6 is a diagram showing label-equivalence information according to the present invention.

Refer to FIG. 1 and FIG. 2. The present invention proposes a multi-point image labeling method, which uses an image labeling device 100 to label an object pixel matrix 60 (as shown in FIG. 5A). The image labeling device 100 comprises a controller 101, an input image memory 102, a multi-pixel image labeling unit 103, and an output labeled memory 104. The architecture of the present invention comprises a labeling process 10, a label-equivalence information processing process 20, a register 30, an equivalent-substitution processing process 40, and an image labeled value substitution process 50. Refer to FIG. 3, FIG. 4A and FIG. 4B. The controller 101 of the present invention provides a multi-point label window 11 which has at least three (three is preferred) inclined-arranged label points 111. The multi-pixel image labeling unit 103 of present invention provides a label-equivalence window 12 at the same time. In the label-equivalence information processing process 20, the label-equivalence window 12 is used to generate label-equivalence information 121, as shown in FIG. 6.

Figure 5B:
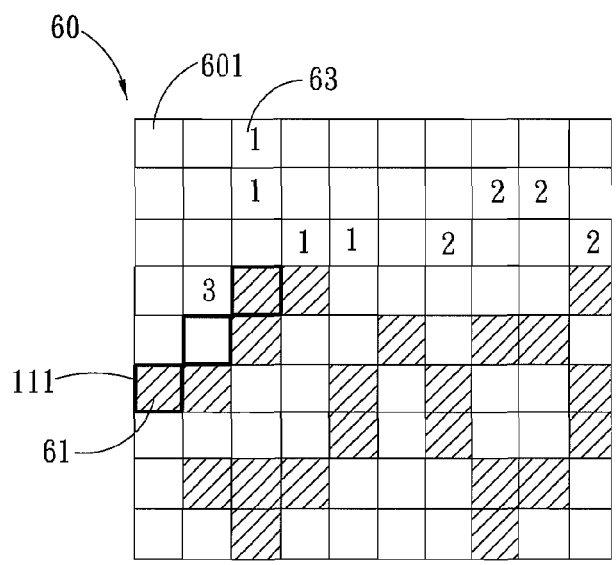
FIG. 5B is a diagram schematically showing an object pixel matrix being labeled according to the present invention.
Figure 5C:
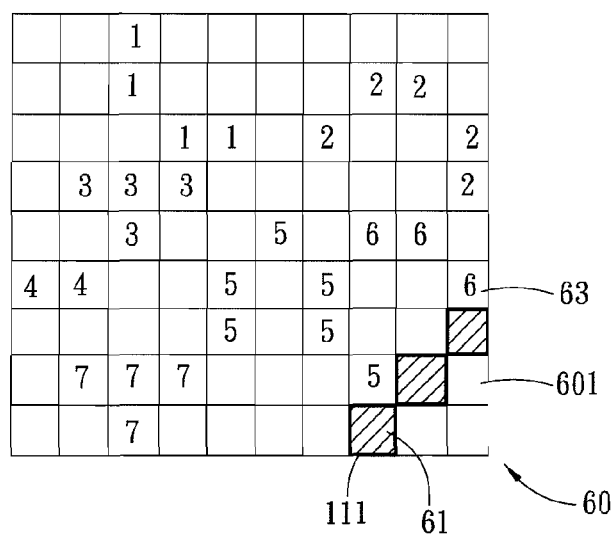
FIG. 5C is a diagram schematically showing an object pixel matrix having been labeled according to the present invention.
Figure 10:
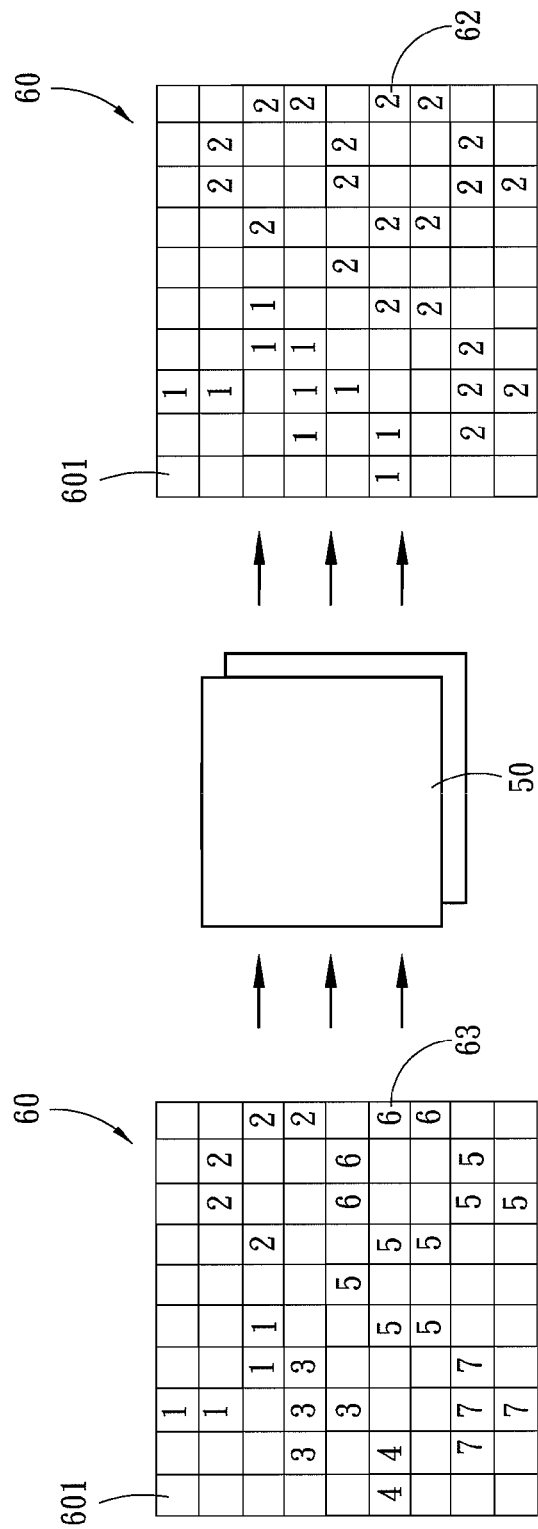
FIG. 10 is a diagram schematically showing a substitution for temporary labeled values according to the present invention.

Refer to FIGS. 5A-5C and FIG. 6. The method of the present invention is used to label the object pixel matrix 60 in order that the object pixel matrix 60 can have image data 61 and the adjacent array elements 601 with the image data 61 can be labeled to have an identical image labeled value 62, as shown in FIG. 10. In the labeling process 10, the object pixel matrix 60 is stored into the input image memory 102 beforehand. Next, the controller 101 uses the three label points 111 to simultaneously scan the object pixel matrix 60 and provide the data of the object pixel matrix 60 to the multi-pixel image labeling unit 103. Next, the multi-pixel image labeling unit 103 labels the array elements 601, which contain image data 61, temporary labeled values 63, Next, multi-pixel image labeling unit 103, assigns the non-zero temporary labeled value 63 to label the array element 601 according to the temporary labeled values 63 of the adjacent array elements 601 and stores the non-zero temporary labeled value 63 in the register 30. When all of the adjacent array elements 601 are unlabeled a new temporary labeled value 63 (may be a natural number) which is not stored in the register 30 is designated and labeled. When the array elements 601 have at least one adjacent array element 601 labeled the temporary labeled values, the temporary labeled value 63 is selected from the left side according to a clockwise priority rule. The above-mentioned processes are shown in FIGS. 5A-5C, and three array elements 601 are labeled simultaneously. As shown in FIG. 5A, the first label point 111 (the rightmost one) has an array element 601 containing image data 61 without any adjacent temporary labeled value 63. Thus, a new temporary labeled value 63 —"1" is given. As shown in FIG. 5B, the label point 111 has two array elements 601 containing image data 61. The first (rightmost) label point 111 has two adjacent array elements 601 with temporary labeled values 63 and thus selects "3" as the temporary labeled value 63 according to the clockwise priority rule. "4" is given to the third (leftmost) label point 111 as the temporary labeled value 63. As shown in FIG. 5C, the label points 111 have all three array elements 601 containing image data 61. The first (rightmost) label point 111 has only one adjacent temporary labeled values 63 and thus uses "6" as the temporary labeled value 63. The second (middle) label point 111 has two adjacent temporary labeled values 63 "5" and "6" and thus selects "5" as the temporary labeled value 63. The third (leftmost) label point 111 uses "5" as the temporary labeled value 63.

When the adjacent array elements 601 which have different temporary labeled values 63 are connected by the image data 61 and satisfy the form of the label-equivalence window 12, the label-equivalence window 12 associates the two different temporary labeled values 63 that are connected in the adjacent array elements 601 to generate label-equivalence information 121 and records the label point 111 used by the label-equivalence information 121. In FIG. 6, 1-6 are the serial numbers, and LE1-LE3 are respectively label-equivalence information 121 of three label points 111.

When the adjacent array elements 601 which have different temporary labeled values 63 are connected by the image data 61 and satisfy the form of the label-equivalence window 12. Then, the label-equivalence window 12 associates the two different temporary labeled values 63 that are connected in the adjacent array elements 601 to generate label-equivalence information 121 and records the label point 111 used by the label-equivalence information 121. In FIG. 6, 1-6 are the serial numbers, and LE1-LE3 are respectively label-equivalence information 121 of three label points 111.

Figure 7A:
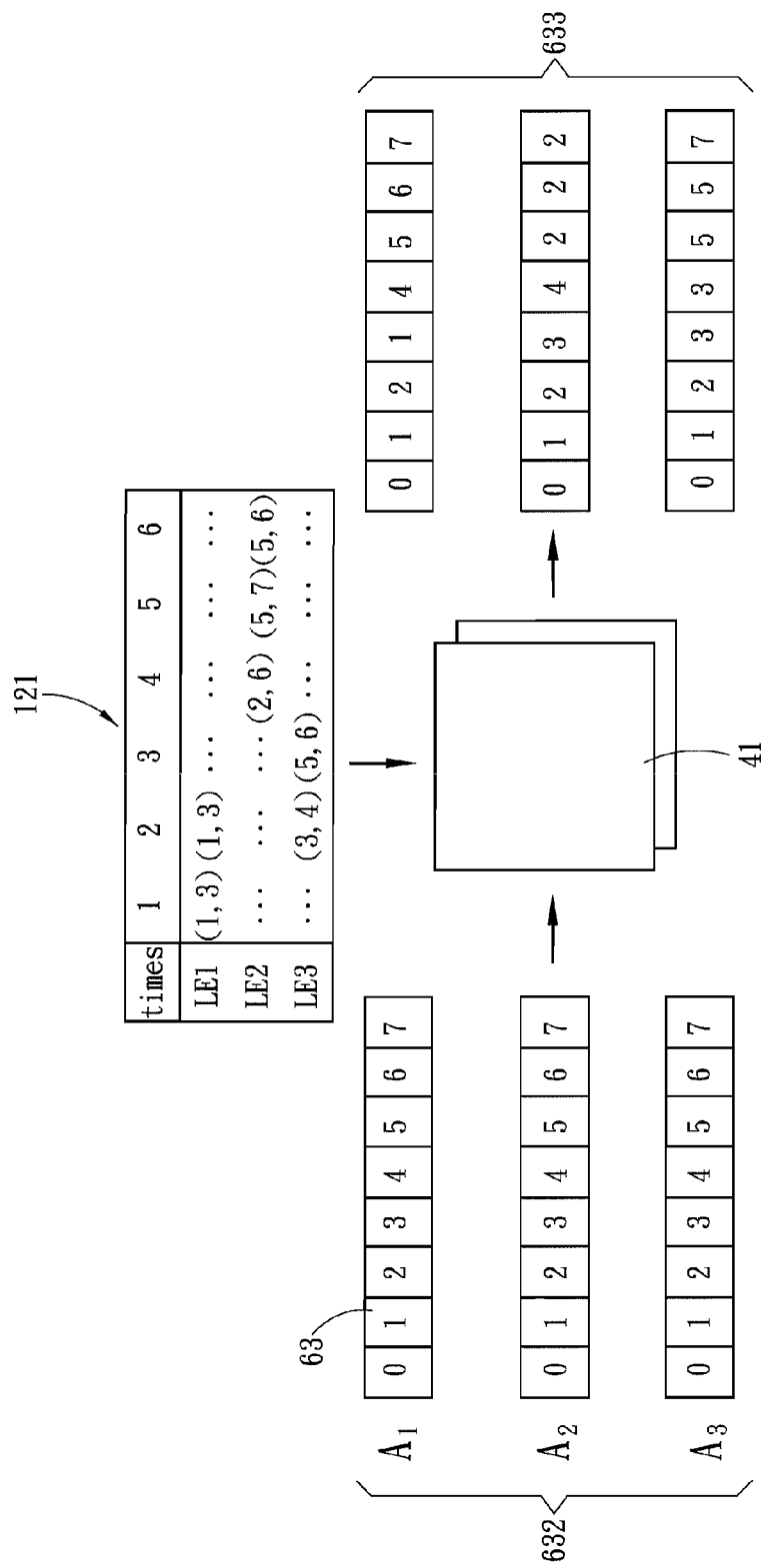
FIG. 7A is a diagram schematically showing an equivalent-substitution processing process according to the present invention.
Figure 7B:
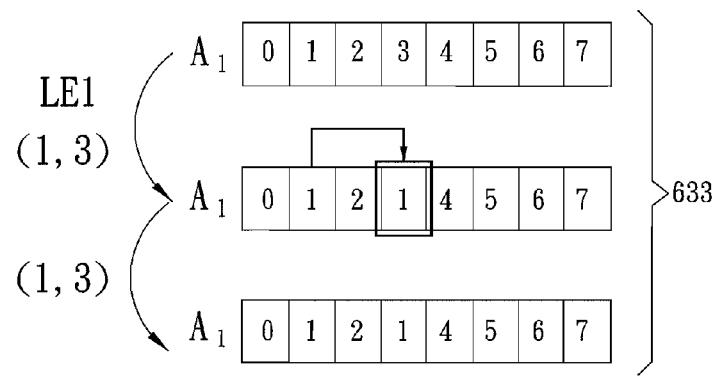
FIGS. 7B-7D are diagrams schematically showing the processes of an intra-row substitution processing process according to the present invention.
Figure 7C:
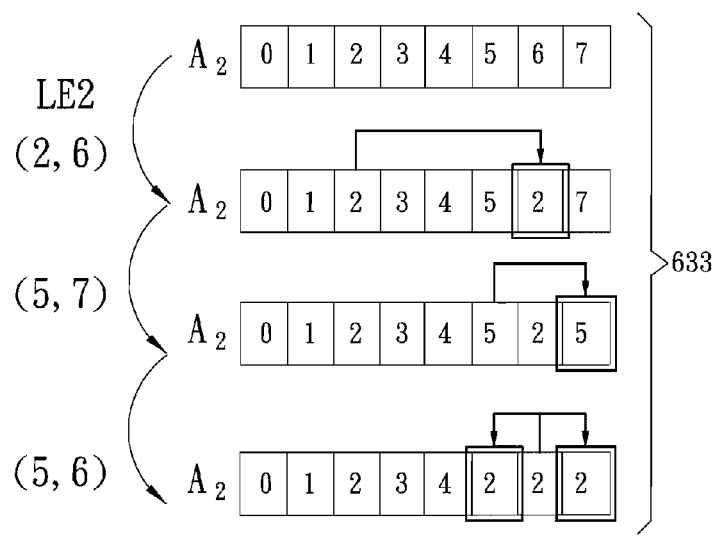
Figure 7D:
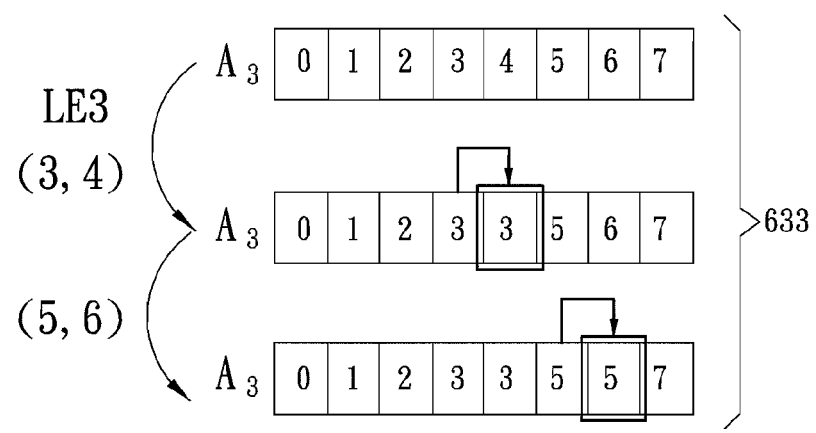

Refer to FIGS. 7A-7D, FIG. 8, FIGS. 9A-9F, and FIG. 10. The multi-pixel image labeling unit 103 of the present invention performs an equivalent-substitution processing process 40 on the temporary labeled values 63 according to the label-equivalence information 121. The equivalent-substitution processing process 40 is divided into an intra-row substitution processing process 41 and an inter-row substitution processing process 42. The equivalent-substitution processing process 40 generates label-equivalence substitution information 631 of the associated temporary labeled values 63. Firstly, the equivalent-substitution processing process 40 generates an initial matrix 632 according to the number of the temporary labeled values 63 and the number of the label points 111 of the multi-point label window 11. Each row of the initial matrix 632 respectively represents one label point 111, which are separately designated by A1-A3. Each column of the initial matrix 632 respectively represents the temporary labeled value 63, which are separately designated by 0-7, wherein 0 denotes none image data. Next, as shown in FIG. 7A, the intra-row substitution processing process 41 examines the rows one by one to find out the associated temporary labeled values 63 according to the label-equivalence information 121 and then replaces the greater associated temporary labeled values 63 with a smaller associated temporary labeled value 63 to generate an intermediary matrix 633. The details of the intra-row substitution processing process 41 are further shown in FIGS. 6B-6D. In FIG. 7B, $A_1$ receives a piece of label-equivalence information 121—(1, 3) and finds the associated temporary label values "1" and "3" in column 1 and column 3, respectively. The smaller temporary labeled value "1" is used to replace the greater temporary labeled value "3". In FIG. 7C, $A_2$ receives a piece of label-equivalence information 121—(2, 6) and thus let the temporary labeled value "2" replaces the temporary labeled value "6". Next, $A_2$ also receives a piece of label-equivalence information 121—(5, 7) and thus let the temporary labeled value "5" replaces the temporary labeled value "7". In the following, $A_2$ receives a piece of label-equivalence information 121-(5, 6) and thus let the temporary labeled value "2" replaces the temporary labeled value "5" because the temporary labeled value in column 6 has been substituted by "2". In FIG. 7D, $A_3$ receives a piece of label-equivalence information 121—(3, 4) and thus let the temporary labeled value "3" replaces the temporary labeled value "4". $A_3$ also receives a piece of label-equivalence information 121—(5, 6) and thus let the temporary labeled value "5" replaces the temporary labeled value "6".

Figure 8:
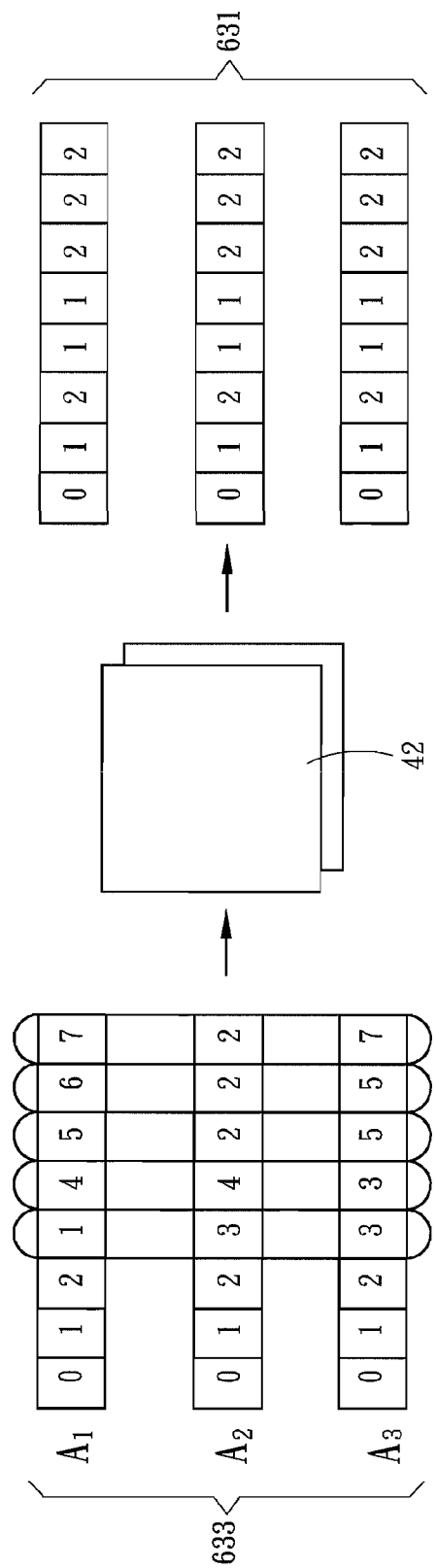
FIG. 8 is another diagram schematically showing an equivalent-substitution processing process according to the present invention.
Figure 9A:
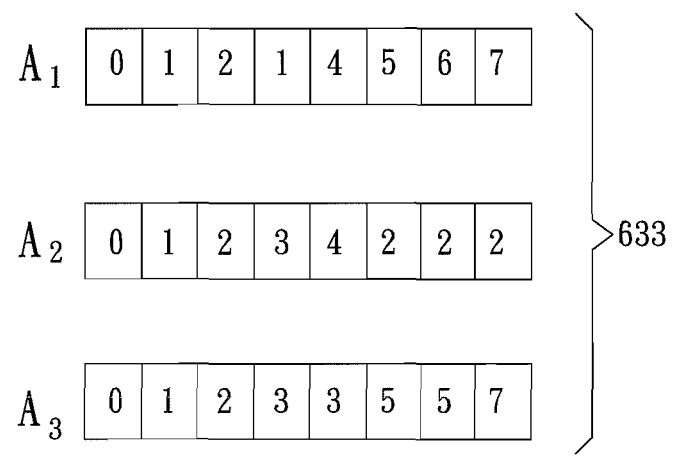
Figure 9B:
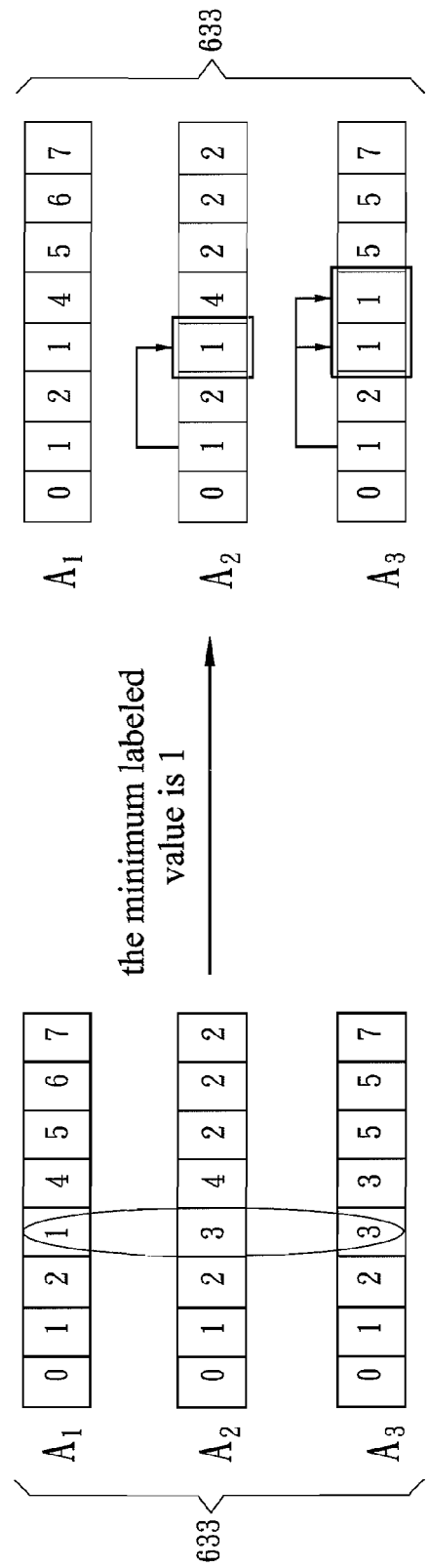
Figure 9C:
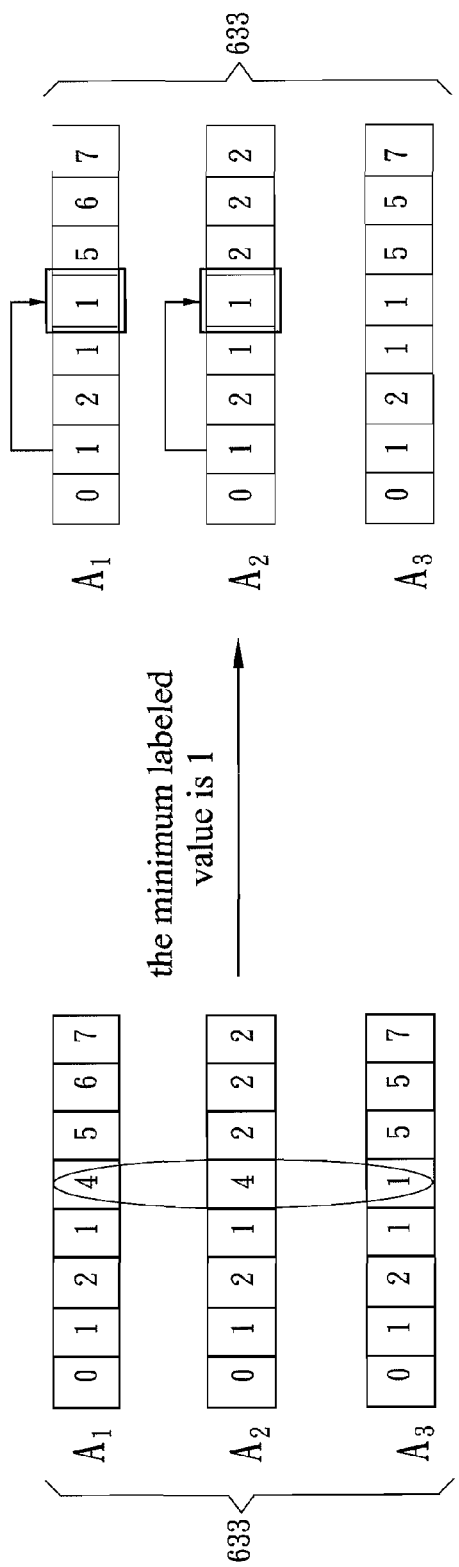
Figure 9D:
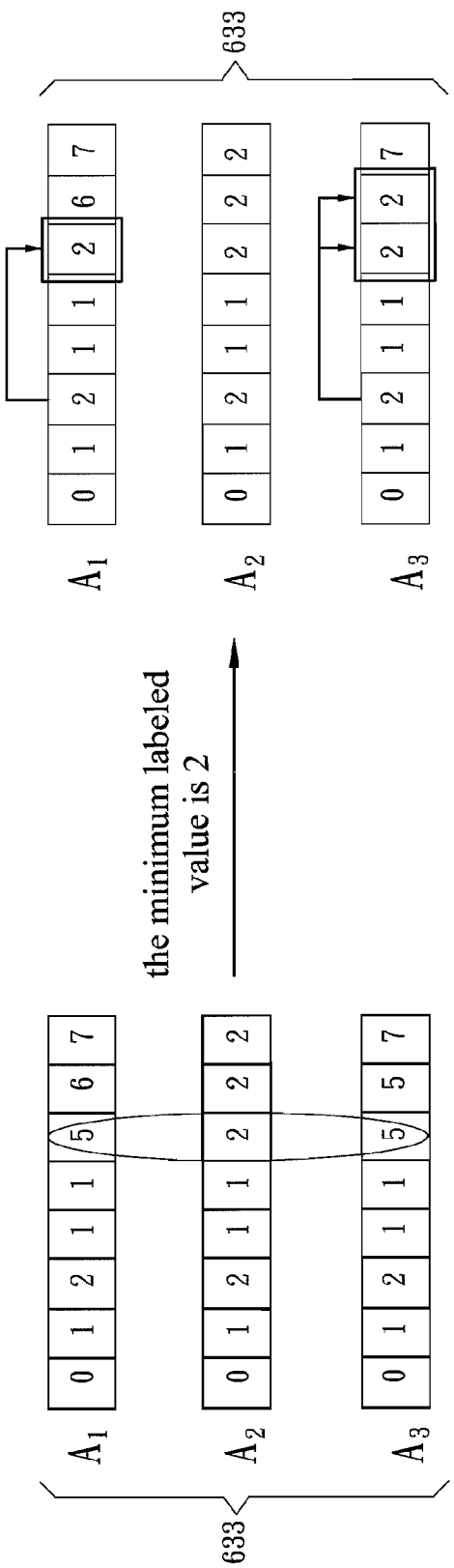
Figure 9E:
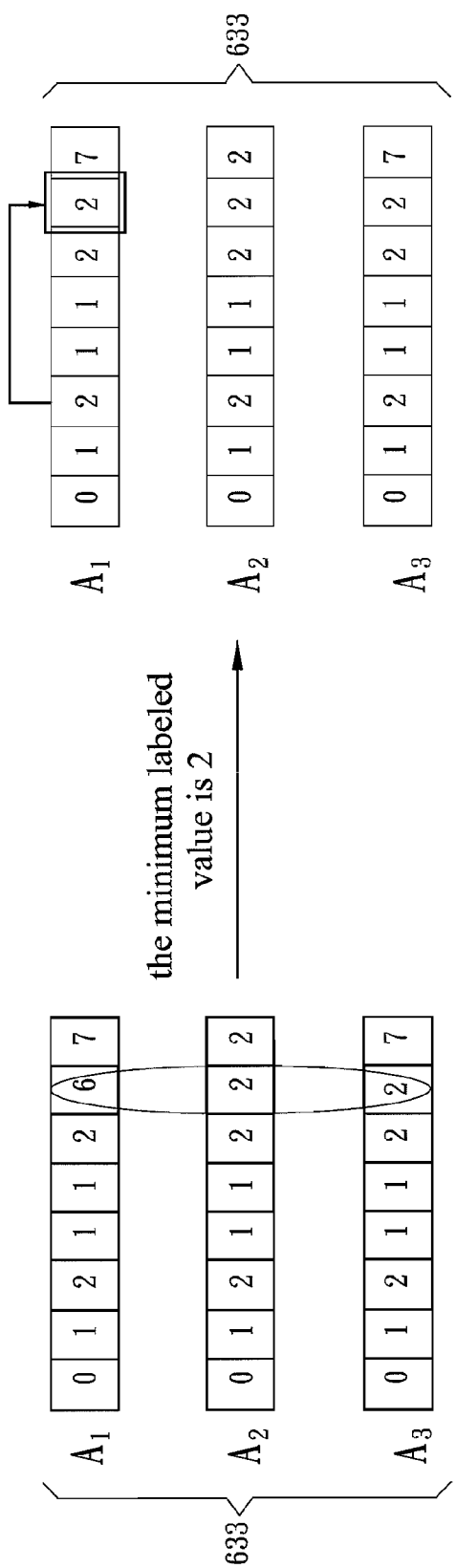
Figure 9F:
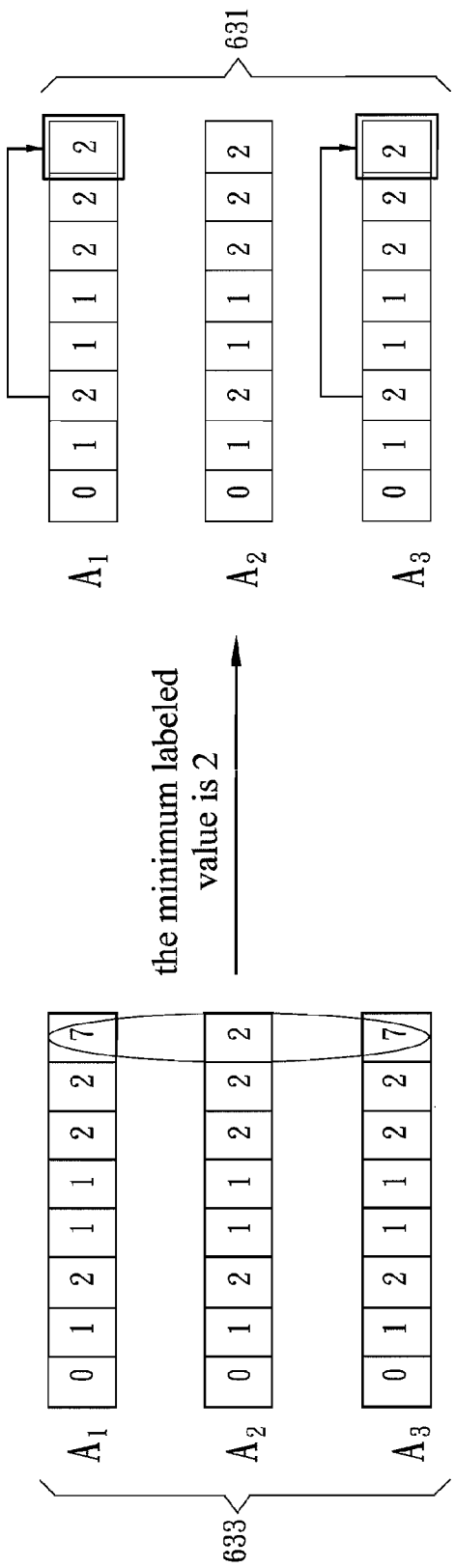

Refer to FIG. 8. The inter-row substitution processing process 42 examines the intermediary matrix 633 column by column to find out the minimum value among the associated temporary labeled values 63. The minimum value is used to get the value at the corresponding column to replace the greater value in the same row. The details of the inter-row substitution processing process 42 are further shown in FIGS. 9A-9F. In FIG. 9B, $A_1$ is found to have a minimum value of "1" in column 3. Thus, the value of column 1 in $A_2/A_3$ is used to replace the labels having the same value as column 3 in $A_2/A_3$. Therefore, "1" replaces "3" in $A_2$ and $A_3$. In FIG. 9C, $A_3$ is found to have a minimum value of "1" in column 4. Thus, the value of column 1 in $A_1/A_2$ is used to replace the labels having the same value as column 4 in $A_1/A_2$. Therefore, "1" replaces "4" in $A_1$ and $A_2$. In FIG. 9D, $A_2$ is found to have a minimum value of "2" in column 5. Thus, the value of column 2 in $A_1/A_3$ is used to replace the labels having the same value as column 5 in $A_1/A_3$. Therefore, "2" replaces "5" in $A_1$ and $A_3$. In FIG. 9E, both $A_2$ and $A_3$ are found to have a minimum value of "2" in column 6. Thus, the value of column 2 in $A_1$ is used to replace the labels having the same value as column 6 in $A_1$. Therefore, "2" replaces "6" in $A_1$. In FIG. 9F, $A_2$ is found to have a minimum value of "2" in column 7. Thus, the value of column 2 in $A_1/A_3$ is used to replace the labels having the same value as column 7. Therefore, "2" replaces "7" in $A_1$ and $A_3$. Thereby, the equivalent-substitution processing process 40 generates the label-equivalence substitution information 631.

Refer to FIG. 10, the multi-pixel image labeling unit 103 performs an image labeled value substitution process 50 to replaces the temporary labeled values 63 according to the label-equivalence substitution information 631 to generate the resultant image labeled values 62. In other words, from the label-equivalence substitution information 631, it is known that "1" should replace "3" and "4" and that "2" should replace "5", "6" and "7". After the temporary labeled values 63 are replaced, the resultant image labeled values 62 can be acquired.

Finally, the controller 101 stores the resultant image labeled values 62 in the output labeled memory 104.

In conclusion, the method of the present invention adopts a multi-point label window 11 having at least three inclined-arranged label points 111 to generate multiple temporary labeled values 63 by multi-point labeling in each window operation. The label-equivalence information 121 is used to integrate associated temporary labeled values 63, and the final image labeled values 62 are finished by the image labeled value substitution process 50. Therefore, the present invention can accelerate the labeling process.

What is claimed is:

1. A multi-point image labeling method, which adopts an image labeling device to label an object pixel matrix including a plurality of array elements to said adjacent array elements having image data to be labeled with identical image labeled values, wherein said image labeling device comprises a controller, an input image memory, a multi-pixel image labeling unit and an output labeled memory, and wherein said method comprising steps of:

storing said object pixel matrix into said input image memory;

providing a multi-point label window through said controller, said multi-point label window including at least three inclined-arranged label points;

providing an label-equivalence window through said multi-pixel image labeling unit to perform an labeling process and an label-equivalence information processing process, wherein said label-equivalence window generates label-equivalence information, wherein said controller simultaneously scans data of said object pixel matrix via said three label points and provides said data to the multi-pixel image labeling unit so that said multi-pixel image labeling unit labels said array elements which have said image data temporary labeled values, wherein said multi-pixel image labeling unit assigns a non-zero temporary labeled to label one of said array elements having said image data according to said temporary labeled values of said adjacent labeled array elements and then stores said non-zero temporary labeled values in a register, wherein when all of said adjacent array elements are unlabled, a new temporary labeled value which is not stored in the register is assigned to label said array element, wherein when at least one non-zero temporary labeled value is in said adjacent array element, said non-zero temporary labeled value is selected at the first priority according to a clockwise priority rule, and wherein when at least two adjacent temporary labeled values are in said array element, said label-equivalence window associates two different temporary labeled values which are connected by said image data in said adjacent array element to generate said label-equivalence information, wherein said multi-pixel image labeling unit performs an equivalent-substitution processing process on said temporary labeled values according to said label-equivalence information to generate label-equivalence substitution information of said temporary labeled values associated with each other, wherein said multi-pixel image labeling unit performs an image labeled value substitution process according to said label-equivalence substitution information to replace said temporary labeled values with image labeled values, and wherein said controller stores said image labeled values in said output labeled memory.

2. The multi-point image labeling method according to claim 1, wherein said equivalent-substitution processing process generates an initial matrix according to a number of said temporary labeled values and a number of said label points of said multi-point label window; each row of said initial matrix respectively represents said label point; each column of said initial matrix respectively represents said temporary labeled value; said rows are examined one by one to find out said temporary labeled values associated with each other according to said label-equivalence information, and then said temporary labeled values that are greater are replaced with one said temporary labeled value that is smaller; said columns are examined one by one to replace said temporary labeled values having a greater value with one said temporary labeled value having a smaller value among different said rows; and said label-equivalence substitution information is thus generated.

3. The multi-point image labeling method according to claim 1, wherein said priority rule is a clockwise priority rule with a left side as a start point.

4. The multi-point image labeling method according to claim 1, wherein said multi-point label window has three label points.

* * * * *